United States Patent
Anderson et al.

(10) Patent No.: US 11,634,210 B2
(45) Date of Patent: Apr. 25, 2023

(54) DYNAMIC AXIAL PRELOADING WITH FLEXURE PLATE

(71) Applicant: Aerostar International, LLC, Columbia, MD (US)

(72) Inventors: Kevin Anderson, Sunnyvale, CA (US); Nathan Winder, San Jose, CA (US)

(73) Assignee: Aerostar International, LLC, Sioux Falls, SD (US)

( * ) Notice: Subject to any disclaimer, the term of this patent is extended or adjusted under 35 U.S.C. 154(b) by 954 days.

(21) Appl. No.: 16/442,733

(22) Filed: Jun. 17, 2019

(65) Prior Publication Data

US 2020/0198771 A1    Jun. 25, 2020

Related U.S. Application Data

(60) Provisional application No. 62/782,129, filed on Dec. 19, 2018.

(51) Int. Cl.
| | | |
|---|---|---|
| *B64C 15/02* | (2006.01) | |
| *F16C 21/00* | (2006.01) | |
| *F16C 23/08* | (2006.01) | |
| *B64B 1/62* | (2006.01) | |

(Continued)

(52) U.S. Cl.
CPC ............... *B64C 15/02* (2013.01); *B64B 1/40* (2013.01); *B64B 1/62* (2013.01); *F04D 29/059* (2013.01);

(Continued)

(58) Field of Classification Search
CPC ..... B64C 15/02; B64C 2201/141; B64B 1/40; B64B 1/62; F04D 29/059; F16C 21/00;

(Continued)

(56) References Cited

U.S. PATENT DOCUMENTS

| | | | |
|---|---|---|---|
| 5,366,350 A | 11/1994 | Fujii et al. | |
| 9,422,048 B1 | 8/2016 | Roach et al. | |
| 9,534,504 B1 | 1/2017 | Gartner | |
| 11,260,950 B2 * | 3/2022 | Anderson | ............. F16K 31/508 |

(Continued)

FOREIGN PATENT DOCUMENTS

| | | |
|---|---|---|
| KR | 1020160024328 A | 3/2016 |
| WO | 2020132000 | 6/2020 |

OTHER PUBLICATIONS

"International Application Serial No. PCT US2019 067064, international Preliminary Report on Patentability dated Jul. 1, 2021", 9 pgs.

(Continued)

*Primary Examiner* — Valentina Xavier
(74) *Attorney, Agent, or Firm* — Kim and Lahey Law Firm, LLC

(57) ABSTRACT

A system for an unmanned aerial vehicle can include an altitude control system, which further includes a compressor assembly, a valve assembly, and an electronics assembly. The compressor assembly may include a driveshaft and a bearing assembly configured to rotate the driveshaft. The driveshaft may be formed from a first material and a compressor housing may be formed from a second material. The first and second materials may have different rates of thermal expansion. A dynamic preloading mechanism, such as a flexible plate, may be provided within the compressor assembly to exert a preloading force on the bearing assembly. Throughout the duration of the flight of the unmanned aerial vehicle, the preloading mechanism can continually compensate for differences in rates of thermal expansion between the first and second materials throughout.

22 Claims, 10 Drawing Sheets

(51) Int. Cl.
  *F04D 29/059* (2006.01)
  *B64B 1/40* (2006.01)
  *F16C 25/08* (2006.01)

(52) U.S. Cl.
  CPC .............. *F16C 21/00* (2013.01); *F16C 23/08* (2013.01); *F16C 25/083* (2013.01); *B64C 2201/141* (2013.01); *F04C 2240/50* (2013.01); *F16C 2229/00* (2013.01)

(58) Field of Classification Search
  CPC .... F16C 23/08; F16C 25/083; F16C 2229/00; F16C 19/547; F16C 35/045; F16C 19/163; F16C 2240/60; F16C 2326/47; F16C 2380/28; F04C 2240/50
  See application file for complete search history.

(56) References Cited

U.S. PATENT DOCUMENTS

| | | | |
|---|---|---|---|
| 2001/0018026 A1 | 8/2001 | Lampe et al. | |
| 2013/0062458 A1 | 3/2013 | Shenhar | |
| 2014/0353424 A1* | 12/2014 | Ratner | B64B 1/64 244/128 |
| 2017/0082115 A1 | 3/2017 | Oshita et al. | |

OTHER PUBLICATIONS

International Search Report and Written Opinion for Application No. PCT/US2019/067064 dated Apr. 16, 2020.

* cited by examiner

DYNAMIC AXIAL PRELOADING WITH FLEXURE PLATE

CROSS-REFERENCES TO RELATED APPLICATIONS

The present application claims the benefit of the filing date of U.S. Provisional Application No. 62/782,129 filed on Dec. 19, 2018, the disclosure of which is hereby incorporated herein by reference.

BACKGROUND

Unmanned aerial vehicles, such as balloons, may operate at substantial altitudes. Such vehicles may operate within the Earth's stratosphere, having favorably low wind speeds at an altitude between 18 and 25 km (11-15 mi). Wind speed and wind direction vary at certain altitudes, allowing unmanned vehicles to rely on the wind speed and wind direction alone for navigation, without the need for additional propulsion means. Unmanned vehicles must therefore increase or decrease their altitude to change course or to increase speed.

BRIEF SUMMARY

Aspects of the present disclosure are advantageous for high altitude balloon systems. For instance, one aspect of the disclosure provides for a system that includes an altitude control system for an aerial vehicle. The altitude control system further includes a compressor assembly that includes a compressor housing, a motor housing, a drive shaft, a motor, a bearing assembly, and a flexible plate. The compressor housing can include a cavity that extends therethrough. The compressor housing can be comprised of a first material. The motor housing may be disposed within the compressor housing. The driveshaft may extend through the motor housing and the driveshaft may be comprised of a second material. The motor may be coupled to a driveshaft and disposed within the motor housing. The bearing assembly can be configured to provide axial rotation of the driveshaft. The flexible plate may be coupled to the motor housing and the bearing assembly. A coefficient of thermal expansion of the first material can differ from a coefficient of thermal expansion of the second material. The flexible plate may be configured to compensate for differences in rates of thermal expansion between the first and second materials by applying a preloading force to the bearing assembly that changes in response to changes in temperature.

In one example, the bearing assembly can be a ball bearing assembly that includes a first inner race directly adjacent the driveshaft and a second outer race spaced away from the first inner race. The flexible plate may be directly adjacent to the second outer race. The flexible plate may apply the preloading force to the second outer race when the flexible plate compensates for differences in thermal expansion. In some examples, the flexible plate can further include a bearing seat. The bearing assembly can be positioned within the bearing seat and the bearing seat of the flexible plate can apply the preloading force to the second outer race. The bearing seat can further include a circumferential wall that extends upwardly from a surface of the flexible plate and forms a circumferential perimeter around a portion of the surface of the flexible plate. The bearing seat can be sized to secure the bearing assembly within the circumferential wall.

In another example, the bearing seat can transition from a first diameter adjacent a surface of the flexible plate to a second diameter that is greater than the first diameter. An interior ridge can be formed at the transition between the first and second diameters. The bearing assembly can contact the interior ridge. The flexible plate can be attached to the motor housing. In some examples, the flexible plate is attached to the motor housing along a perimeter of the flexible plate.

In another example, the system further includes an impeller coupled to an end of the driveshaft. The impeller can be configured to draw air into the compressor housing. The compressor housing can further include an inlet and an outlet. The impeller may be positioned at the outlet and the motor housing may overlie the impeller.

In yet another example, the system further includes an outer envelope configured to retain lift gas therein and an inner envelope disposed within the outer envelope. The inner envelope can be configured to retain a ballast gas therein, wherein the compressor assembly regulates an amount of air within the inner envelope.

In still another example of this aspect, the system further includes an outer envelope and an inner envelope disposed within the outer envelope. The outer envelope may be configured to retain a ballast gas therein. The compressor assembly can regulate an amount of air within the outer envelope.

In another example, the motor housing is open at one end and includes an opening. The flexible plate can extend across the opening, so as to enclose an interior space of the motor housing.

Other aspects of the disclosure include a system. The system includes an altitude control system for an aerial vehicle. The altitude control system further includes a compressor assembly and a flexible plate. The compressor assembly includes a compressor housing having a cavity extending therethrough; a motor housing disposed within the compressor housing; a driveshaft extending through the motor housing; a motor coupled to a driveshaft and disposed within the motor housing; a bearing assembly configured to provide axial rotation of the driveshaft; and a flexible plate. The flexible plate may be attached to an end of the motor housing and coupled to the bearing assembly. When the flexible plate is in a first position, the flexible plate may be spaced a first fixed distance from the motor housing and the flexible plate applies a first preloading force to the bearing assembly. In response to a change in temperature, the flexible plate may be configured to move into a second position where the flexible plate is a second fixed distance away from the motor housing that is less than the first fixed distance, the flexible plate applying a second preloading force to the bearing assembly in the second position that is different than the first preloading force.

In one example, the bearing assembly is a ball bearing assembly that includes a first inner race directly adjacent the driveshaft and a second outer race spaced away from the inner race. The flexible plate may be directly adjacent the second race and apply the preloading force to the second outer race when the flexible plate compensates for differences in thermal expansion.

In one example, the flexible plate can further include a bearing seat. The bearing assembly may be positioned within the bearing seat. The bearing seat of the flexible plate can apply the preloading force to the second outer race. The bearing seat can include a circumferential wall extending upwardly from a surface of the flexible plate and form a circumferential perimeter around a portion of the surface of the flexible plate. The bearing seat can be sized to secure the bearing assembly within the circumferential wall.

In another example, the bearing seat can transition from a first diameter closer to the surface of the flexible plate to a second diameter that is greater than the first diameter. An interior ridge can be formed at the transition between the first and second diameters. The bearing assembly can contact the interior ridge.

In yet another example of this aspect, the system further includes an outer envelope and an inner envelope disposed within the outer envelope. The outer envelope may be configured to retain a ballast gas therein, wherein the compressor assembly regulates an amount of air within the outer envelope.

In an alternative example, the system further includes an outer envelope configured to retain a lift gas therein and an inner envelope disposed within the outer envelope. The inner envelope may be configured to retain a ballast gas therein. The compressor assembly can regulate an amount of air within the inner envelope.

In another example, the compressor assembly can further comprise an impeller coupled to the driveshaft, and the motor housing overlies the impeller.

DETAILED DESCRIPTION

Overview

Figure 1:
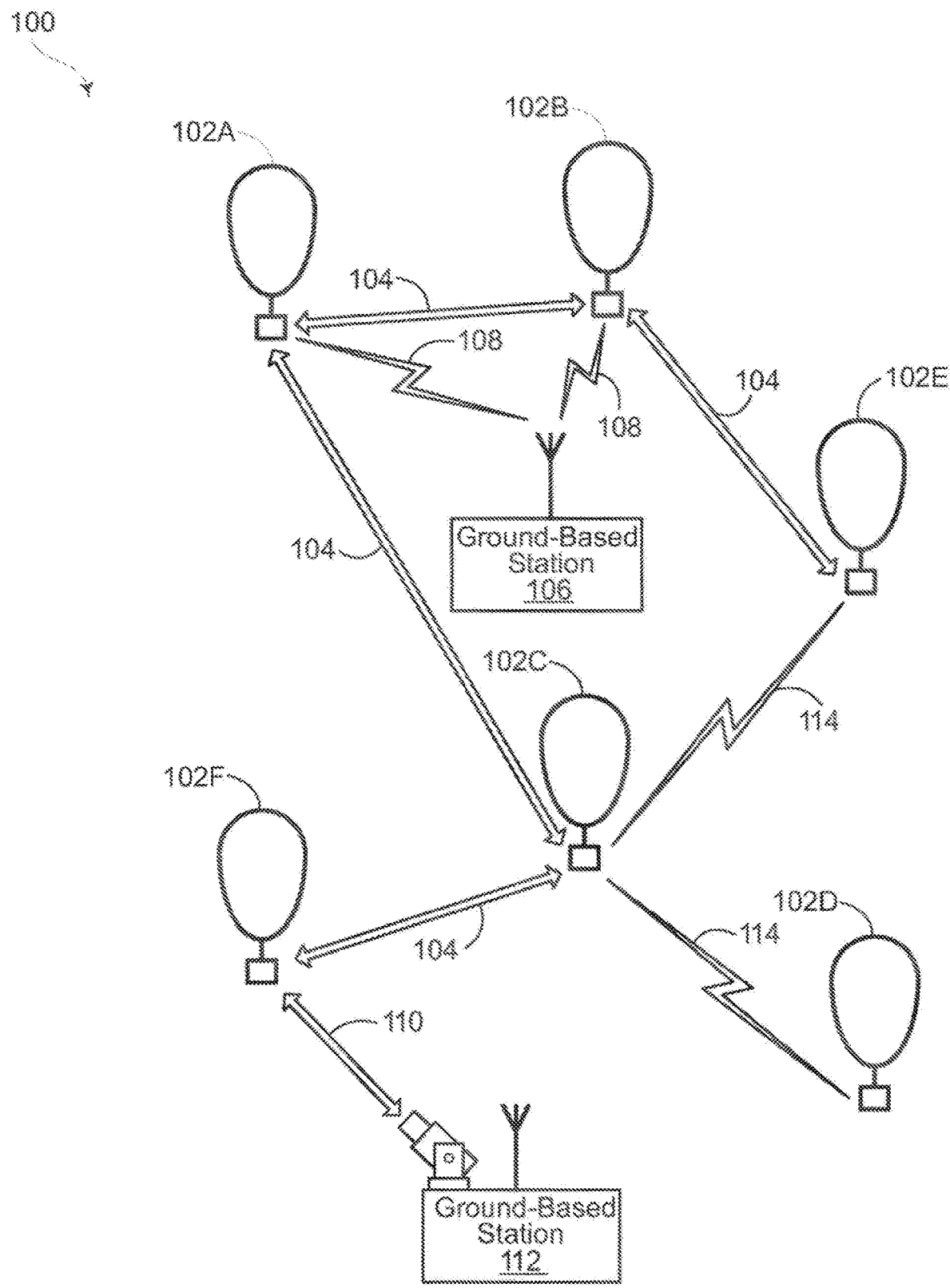
FIG. 1 is a functional diagram of a system in accordance with aspects of the present disclosure.

Altitude control systems may be implemented within unmanned vehicles to increase or decrease the altitude of the unmanned vehicle. Such altitude control systems can include several assemblies, including: (1) an air compressor assembly; (2) a valve assembly, and (3) a control electronic assembly. Each of these components can cooperate to regulate the amount of air and/or gases into and out of the unmanned vehicle, so as to increase or decrease the altitude of the unmanned vehicle, such as a stratospheric balloon.

When implementing an altitude control system in a balloon, weight is paramount. The altitude control system must be made from durable materials capable of withstanding extreme temperature change and harsh environmental conditions. However, to ensure that the weight of the altitude control system does not adversely affect balloon flight and lift, the selected materials cannot be too heavy. The housings and the majority of the components of the altitude control system are therefore typically comprised of a light weight material, such as aluminum. Aluminum has the added advantages of being naturally corrosion resistant, ductile, and capable of maintaining the structure of the housings. Moreover, aluminum is approximately one-third the density of steel, such that aluminum parts can be made thicker to increase their strength, while still allowing for an overall reduction in weight of the vehicle.

To enable manufacture of an altitude control system small enough to be used with an envelope of an unmanned aerial vehicle, a driveshaft made of steel can be implemented within the compressor assembly of the altitude control system. A driveshaft made from a lighter material having a coefficient of thermal expansion that can match the remainder of the altitude control system, such as aluminum, would have an excessive diameter necessary to provide the strength and stiffness of steel and would not be practical to employ. The result is an altitude control system with a shaft that expands and contracts at a different rate than the majority of the altitude control system.

The mismatched coefficients of thermal expansion of steel and aluminum coupled with backpressure from within the balloon envelope, and the extreme temperature changes caused by the surrounding environment at high altitudes, may lead to failure of the altitude control system. In many instances, the bearings of the bearing assemblies become unloaded, which may lead to catastrophic failure. Similarly, because the altitude control system must operate at very high rotational velocities, critical shaft rotor dynamic mode may occur inside the operating range of the device and may also lead to catastrophic failure.

The uncontrollable temperature changes that cause expansion and contraction of these components at different rates throughout the duration of the balloon flight, make it difficult to predict and provide for a preloading force that can be dynamically applied to the bearing assembly. The solution to address these issues has been to carefully machining the compressor and shaft assembly components to specific tolerances to accommodate expansion and contraction of these materials. This procedure is time consuming, costly, and complex, both in terms of determining the appropriate tolerances, as well as machining components within the predefined tolerances. In addition, such procedure provides many possibilities for failure since the tolerances must be accurately determined for each individual component, and the failure at any one of these components will result in overall failure of the altitude control system. Moreover, tolerancing components of the altitude control system is limited to the exact ranges of tolerances provided; any condition which puts the system outside of this predetermined tolerance may very likely result in failure of the altitude control system.

To address such failures, a dynamic axial preloading mechanism can be integrated inside the motor housing of a device, such as an air compressor, and that can maintain bearing preload of a rotating shaft assembly in order to achieve a long-lasting device when ongoing maintenance cannot be performed. Bearing preload can be critical to extend the life of the rotating shaft assembly of a motor within the unmanned aerial vehicle, which must fly for the duration of its life without returning to the ground. In accordance with aspects of the disclosure, axial support, in combination with dynamic preload can address shortcomings related to backpressure from within an envelope, mismatched coefficient of thermal expansion, and extreme temperature changes caused by the environment surrounding the aerial device. Such aspects help to eliminate the manufacture of individual components that separately address these shortcomings.

An example altitude control system may include a dynamic axial preloading mechanism for the rotating shaft assembly of a compressor of an unmanned aerial vehicle. A rotating driveshaft may be coupled at one end to an impeller and a second end to a distal bearing assembly. The preloading mechanism can include a backplate which supports and seats the distal bearing assembly. The backplate may be flexible and movable to exert a continuous force on the distal bearing assembly. For example, the backplate may flex in response to changes in temperature. Further, the motor housing can be integrated with the overall structure of the altitude control system so as to allow for the motor to be rigidly/stiffly held in place. This can help to improve stiffness which is critical to keeping the critical shaft modes outside/above the operating range of the device.

When in use, as the environment changes, the backplate may flex and press on the bearing assembly to keep the bearing assembly preloaded and engaged. This can help to prevent the catastrophic failure that would result from unloading the bearing at high speed. The backplate therefore compensates for changes in atmosphere, backpressure, temperature, etc. that would otherwise affect the bearing assembly.

Thus, the features disclosed herein may provide for an altitude control system that utilizes an air compressor assembly with dynamic axial preloading for use with an unmanned aerial aircraft. Such features may address the shortcomings associated with failure of the rotating shaft assembly of a motor within the unmanned aerial vehicle due to external forces to the bearing assembly caused by, for example, backpressure from within an envelope of the balloon, mismatched coefficient of thermal expansion between the material comprising the driveshaft (for example steel) and the material comprising the housing (for example formed of aluminum), and large temperature changes caused by the environment surrounding a device within the unmanned aerial vehicle. In this regard, the features disclosed even eliminate the need to manufacture individual components that separately address these shortcomings.

Example System

FIG. 1 depicts an example system 100 in which an aircraft as described above may be used. This example should not be considered as limiting the scope of the disclosure or usefulness of the features of the present disclosure. For example, the techniques described herein can be employed on various types of aircraft and systems. In this example, system 100 may be considered a "balloon network" though in addition to balloons the network may include other types of aircraft including other airships, etc. As such, the system 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
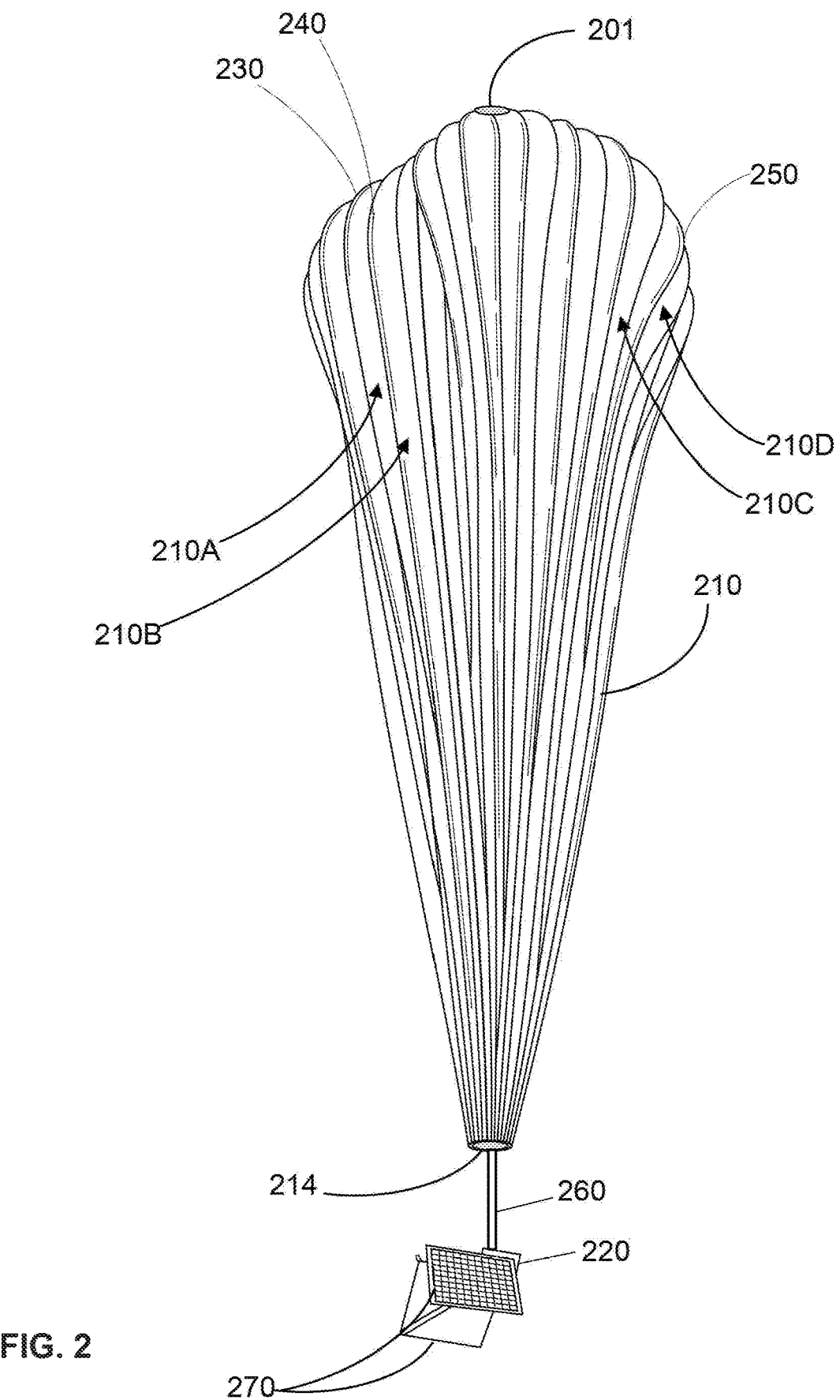
FIG. 2 is an example of a balloon in accordance with aspects of the present disclosure.

FIG. 2 is an example balloon 200, which may represent any of the balloons of the system 100. As shown, the balloon 200 includes an outer envelope 210, a payload 220 and a plurality of tendons 230, 240 and 250 attached to the outer envelope 210. The balloon outer envelope 210 may take various forms. In one instance, the balloon outer envelope 210 may be constructed from materials such as polyethylene that do not hold much load while the balloon 200 is floating in the air during flight. Additionally, or alternatively, some or all of outer envelope 210 may be constructed from a highly flexible latex material or rubber material such as chloroprene. Other materials or combinations thereof may also be employed. Further, the shape and size of the outer envelope 210 may vary depending upon the particular implementation. Additionally, the outer envelope 210 may be filled with various gases or mixtures thereof, such as helium, hydrogen or any other lighter-than-air gas. The outer envelope 210 is thus arranged to have an associated upward buoyancy force during deployment of the payload 220.

The payload 220 of balloon 200 may be affixed to the envelope by a connection 260 such as a cable or other rigid structure. The payload 220 may include a computer system (not shown), having one or more processors and on-board data storage. The payload 220 may also include various other types of equipment and systems (not shown) to provide a number of different functions. For example, the payload 220 may include various communication systems such as optical and/or RF, a navigation system, a positioning system, a lighting system,) a plurality of solar panels 270 for generating power, a power supply (such as one or more batteries) to store and supply power to various components of balloon 200.

In view of the goal of making the balloon outer envelope 210 as lightweight as possible, the balloon envelope may be comprised of a plurality of envelope lobes or gores that have a thin film, such as polyethylene or polyethylene terephthalate, which is lightweight, yet has suitable strength properties for use as a balloon envelope. In this example, balloon outer envelope 210 is comprised of envelope gores 210A-210D.

Pressurized lift gas within the balloon outer envelope 210 may cause a force or load to be applied to the balloon 200. In that regard, the tendons 230, 240, 250 provide strength to the balloon 200 to carry the load created by the pressurized gas within the balloon outer envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using an apparatus, such as top cap 201 positioned at the apex of balloon outer envelope 210. A corresponding apparatus, e.g., bottom cap 214, may be disposed at a base or bottom of the balloon outer envelope 210. The top cap 201 at the apex may be the same size and shape as and bottom cap 214 at the bottom. Both caps include corresponding components for attaching the tendons 230, 240 and 250 to the balloon outer envelope 210.

Figure 3:
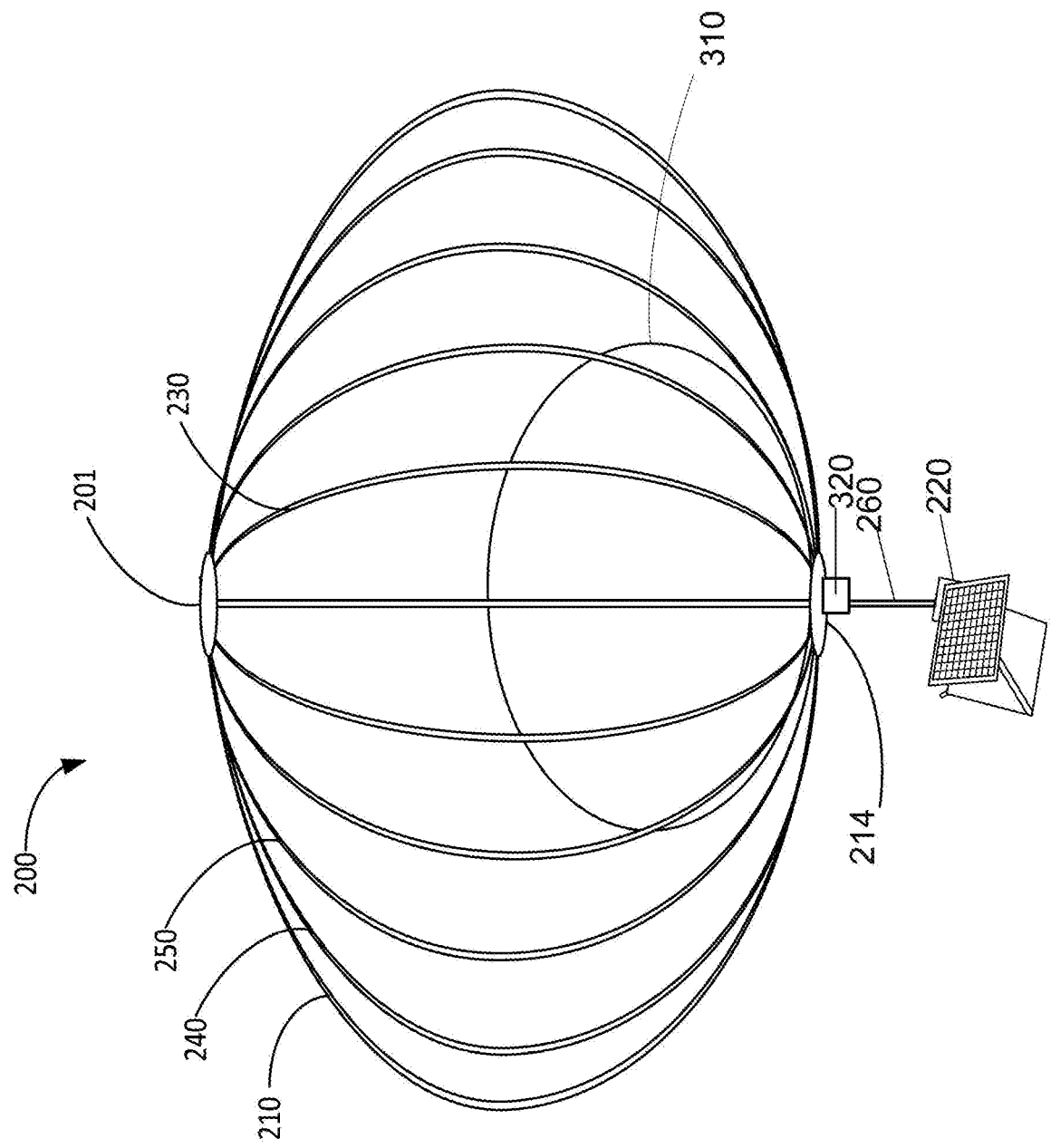
FIG. 3 is an example of a balloon in flight in accordance with aspects of the disclosure.

FIG. 3 is an example of balloon 200 in flight. In this example, the shapes and sizes of the outer envelope 210, connection 260, inner envelope 310, and payload 220 are exaggerated for clarity and ease of understanding. During flight, these balloons may use changes in altitude to achieve navigational direction changes. In this regard, the inner envelope 310 may be a ballonet that holds ballast gas (e.g., air) therein, and the outer envelope 210 may hold lift gas around the ballonet. Alternatively, in a reverse ballonet configuration, the inner envelope 310 may hold lift gas therein and the outer envelope 210 may hold ballast gas (e.g., air) around the inner envelope 310, and the inner envelope 310 may hold the lift gas therein.

Figure 4:
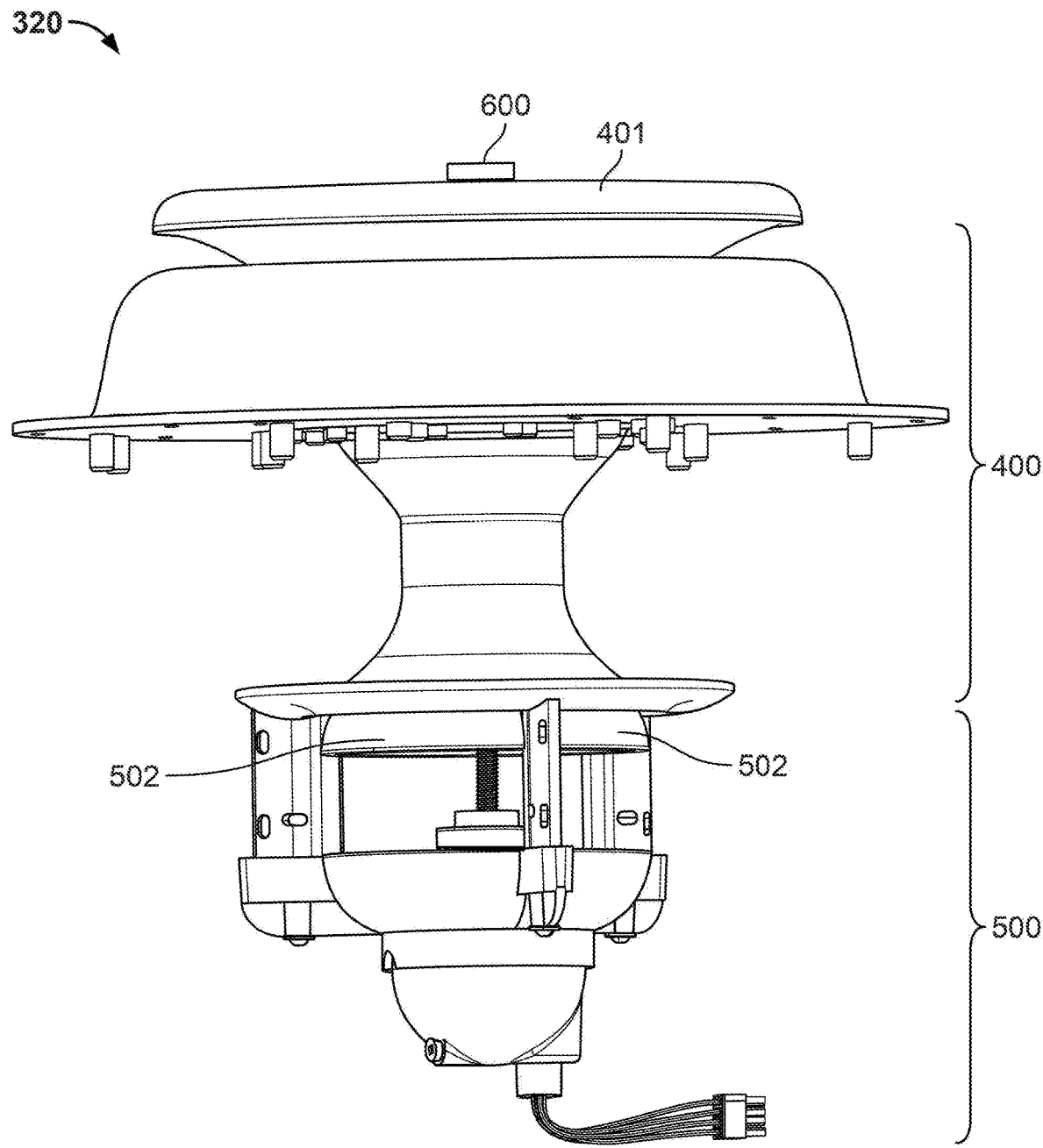
FIG. 4 is an example altitude control system in accordance with aspects of the disclosure.

An altitude control system 320 may be positioned at the bottom cap 214 of the balloon to effect changes in altitude. FIG. 4 is an example altitude control system that includes a (1) air compressor assembly 400; (2) valve assembly 500; and (3) electrical control assembly 600. The air compressor assembly 400 can include a ballonet shroud 401 that can be directly joined to and positioned within an opening in the bottom cap 214. The valve assembly 500 can be directly connected to an opening in the air compressor to regulate the amount of air into and the contents out of the compressor. The electrical control assembly 600 can be positioned within an opening to the ballonet shroud 401.

The air compressor assembly 400 of the altitude control system can cause ballast gas (e.g. air) to be pumped into the inner envelope 310 within the balloon outer envelope 210, which increases the density of the balloon and causes the balloon to descend. Similarly, a valve head 502 (see FIG. 4) of the valve assembly 500 may retract from the inlet of the air compressor and may cause air to be released from the inner envelope 310 (and expelled from the balloon) in order to reduce the mass of the balloon and cause the balloon to ascend. The electrical control assembly 600 may be mounted at the top of the air compressor assembly 400.

Example Air Compressor Assembly

Figure 5:
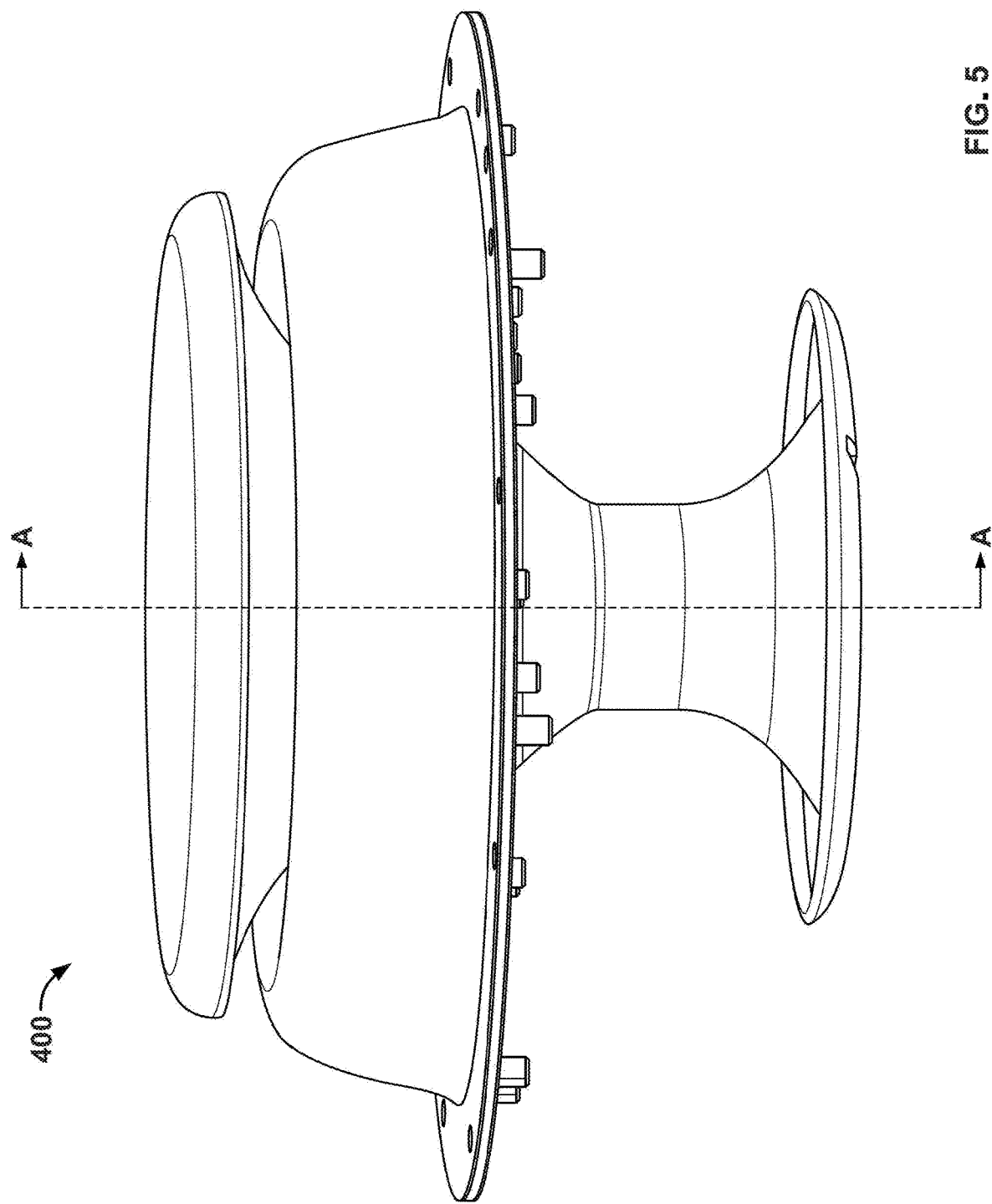
FIG. 5 is an air compressor in accordance with aspects of the disclosure.

FIG. 5 is an example of air compressor assembly 400, which may be used, as noted above, with the altitude control system 320 of an unmanned aerial vehicle, such as a stratospheric balloon. The air compressor assembly 400 can be used to change the amount of air within an envelope (outer envelope 210 or inner envelope 310) by allowing for an increase or decrease in the amount of air provided to the envelope. For instance, a compressor assembly can be configured to provide air to the stratospheric balloon at a rate and volume of air that will allow for flight at particular high altitudes. This change of air within the balloon envelope, as well as a change in air pressure caused by the compressor assembly, can allow for a change in altitude and/or direction.

Figure 6:
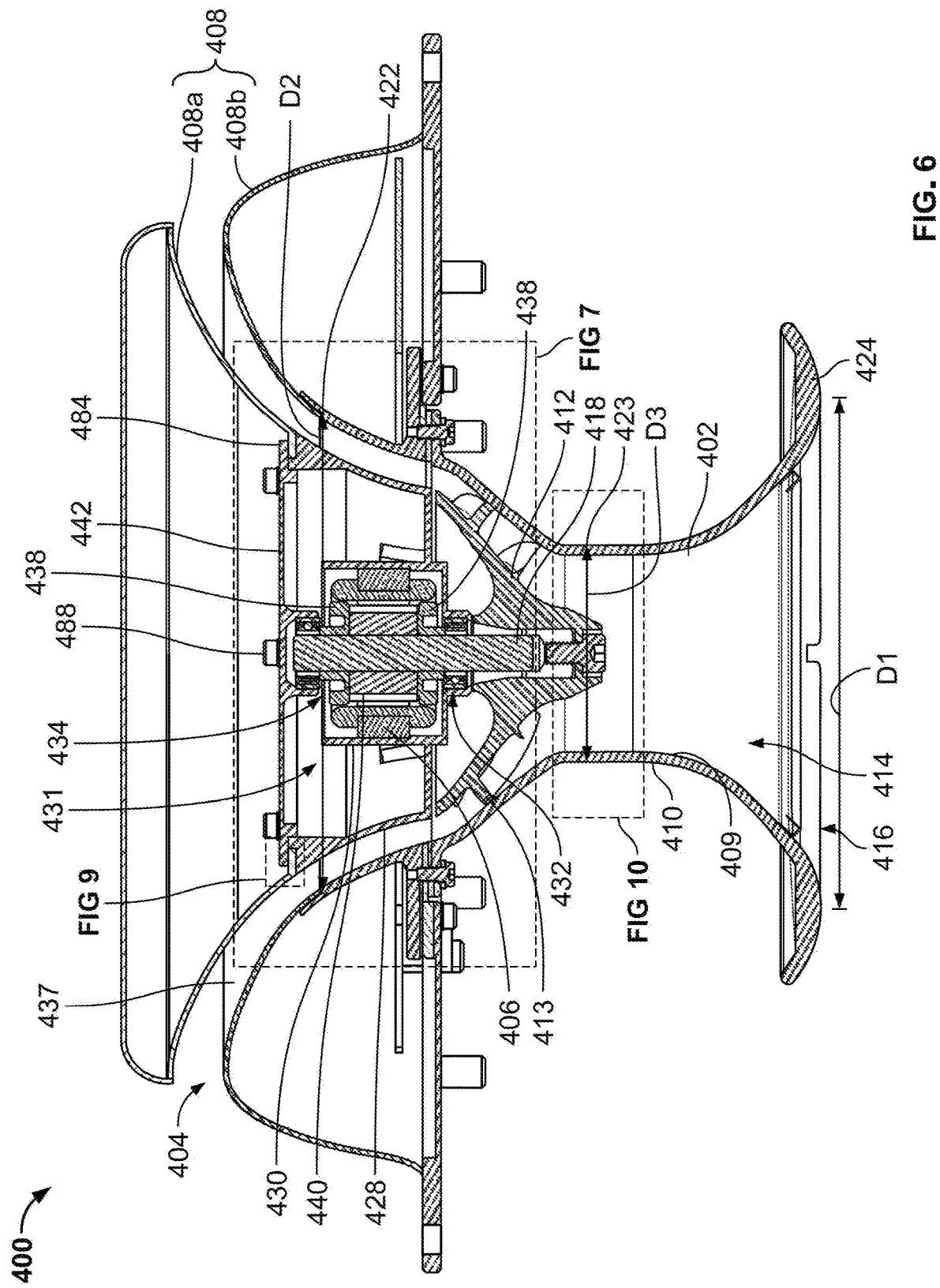
FIG. 6 is cross-sectional view taken along line A-A of FIG. 5.

As shown in the cross-sectional view of FIG. 6, the air compressor assembly 400 can include many structural features. For example, the air compressor assembly can include an inlet 402, an outlet 404, a motor 406, and a motor housing 407. The motor 406 and motor housing 407 can be positioned at the outlet. A diffuser 408 can overlie the motor 406, motor housing 407, a compressor housing 410, and an impeller 412. A cavity 414 or plenum of the air compressor assembly 400 can extend through a central portion of the air compressor assembly 400 and the compressor housing 410. In use, the motor 406 can cause rotation of a driveshaft 418, which is coupled to and causes rotation of the impeller 412, to accelerate and compress captured air, thereby causing the air to become pressurized.

The compressor housing 410 may be generally cylindrical with a circular cross-section. An entrance or opening 416 at the entrance to the inlet 402 of the air compressor assembly 400 can form an intake. The compressor housing 410 can define a cavity 414 therethrough to enable air or other fluid to flow into and out of the compressor housing 410 and the overall air compressor assembly 400. In one example, the cavity 414 extends entirely through the compressor housing 410, with the interior surface 409 of the compressor housing 410 forming a perimeter of the cavity 414. The opening 416 to the compressor housing 410 can have an inlet opening diameter D1 that is greater than the diameter of the compressor housing 410 at any point along the remainder of the cavity 414. This can allow for greater intake of air at the opening 416 to the inlet 402. Although generally illustrated as having a circular configuration, the compressor housing 410 may alternatively include any suitable configuration and need not include a circular cross-section. The compressor housing 410 may be formed of at least one of aluminum, brass, or stainless steel, although other types of material may be contemplated.

The overall shape of the compressor housing 410 can define a generally hour-glass shaped profile having a circular configuration (e.g., the outer dimension of the compressor housing 410 increases and decreases along a longitudinal axis X-X defined through a center portion of the compressor housing 410.) For example, the compressor housing 410 can extend between a first end 422 at an outermost end of the compressor housing 410, and an opposing second end 424 at the entrance 416 to the compressor housing. An intermediate point 423 along the compressor housing 410 may be positioned between the first and second ends 422, 424. The diameter of the compressor housing 410 can therefore vary along the longitudinal axis X-X, such that the diameter D1 at the second end 424 and entrance to the compressor housing 410 and the diameter D2 at the first end 422 are both greater than the diameter D3 at the intermediate point 423. This change in diameter may allow for the compressor housing 410 to transition from a wider arear or end near the first end 422, to a narrower area at the intermediate point 423, and back to a wider end adjacent the second end 424 along the longitudinal axis X-X. Although generally illustrated as having a circular configuration that corresponds to the circular configuration of a diffuser 408 discussed further below, the compressor housing 410 may alternatively include any suitable configuration and need not include a circular cross-section.

An impeller may be positioned within and occupy at least a portion of the inlet 402 of the compressor housing 410. For example, the impeller 412 may be positioned adjacent the intermediate point 423 of the compressor housing 410 and closer to the first end 422 of the compressor housing 410. The impeller 412, along with the impeller blades 413, can help to draw air into and compress air entering into the compressor housing 410.

The impeller 412 may be coupled to a motor and driveshaft, which can cause rotation of the impeller 412. The driveshaft 418 may be comprised of a stiff rigid and strong material to ensure that the driveshaft 418 can operate throughout the duration of the vehicle flight, as well as withstand external forces caused by, for example, extreme changes in temperature, backpressure from the envelope, etc. For example, the driveshaft may be a stainless-steel driveshaft, but other metals or combinations of metals may also be utilized. The motor 406 can also be any variety of motor with sufficient torque and speed to drive the system. An example torque may be 5 NM, but numerous factors can be taken into consideration which can change the necessary torque and speed. In some examples, the motor 406 can be a brushless DC, brushed DC, or any suitable motor so long as it is paired with a suitable controller to operate it.

In one example, the motor 406 and motor housing 407 can be positioned within the outlet 404 of the air compressor assembly and overlie the impeller 412. For example, as shown in FIG. 6, the impeller 412 may be positioned within the inlet 402 of the air compressor assembly 400, such that the impeller 412 is positioned between the motor housing 407 and the opening 416 of the inlet 402.

The diffuser 408 may have a generally planar configuration with a circular profile, although it is contemplated that the diffuser may include any suitable profile, such as square, rectangular, and oval, amongst others. The diffuser 408 may include a first curved portion 408a that can be attached to the first end 422 of the compressor housing 410 and a second curved portion 408b spaced apart from the first curved portion 408a so as to define a passageway 437 therebetween through which air moving through the cavity 414 may freely flow out of the compressor housing 410 and the overall air compressor assembly 400. The diffuser 408 can convert the mechanical work done by the motor 406 and impeller 412 of the air compressor assembly 400 back into potential energy in the form of air pressure. For example, the diffuser 408 can efficiently convert the kinetic energy of the compressed, flowing air into higher pressure, static air in the envelope of the balloon.

In use, the motor will rotate the impeller 412 so that the impeller may draw air into the inlet 402 of the air compressor assembly from the surrounding environment, for instance the external environment of the balloon. Air entering the impeller 412 will be accelerated through the impeller 412 and compressed and flow through the passageway 437 of the diffuser 408 and exit the air compressor assembly.

Example Dynamic Axial Preloading Mechanism for an Air Compressor Bearing Assembly As noted above, when the unmanned aerial vehicle is in flight, the vehicle will be subject to extreme environmental changes. The bearings of the compressor assembly can fail due to unloading caused, for example, by backpressure from the envelope and/or the forces on the driveshaft of the compressor assembly of the altitude control assembly caused by differing rates of thermal expansion. To address this problem, the compressor assembly can be provided with a preloading mechanism to compensate for changing loads on the driveshaft and bearings. According to aspects of the disclosure, an example altitude control system may include a dynamic axial preloading mechanism for the rotating shaft assembly of a compressor of an unmanned aerial vehicle. The preloading mechanism can include a flexible backplate which is configured to exert a preloading force onto the bearing assembly of a compressor assembly. Additionally, the motor housing can be designed to minimize rotordynamic stiffness.

A compressor assembly which includes the axial preloading mechanism disclosed herein may be the air compressor assembly 400 configuration shown in FIGS. 5-6, but alternative compressor assemblies utilizing a preloading mechanism are contemplated within the scope of the disclosure. For ease of discussion, the preloading mechanism and motor housing 407 will be discussed in the context of the air compressor assembly 400, but other types of compressor assemblies can also be utilized in connection with the preloading mechanism and motor housing 407 disclosed herein.

Figure 7:
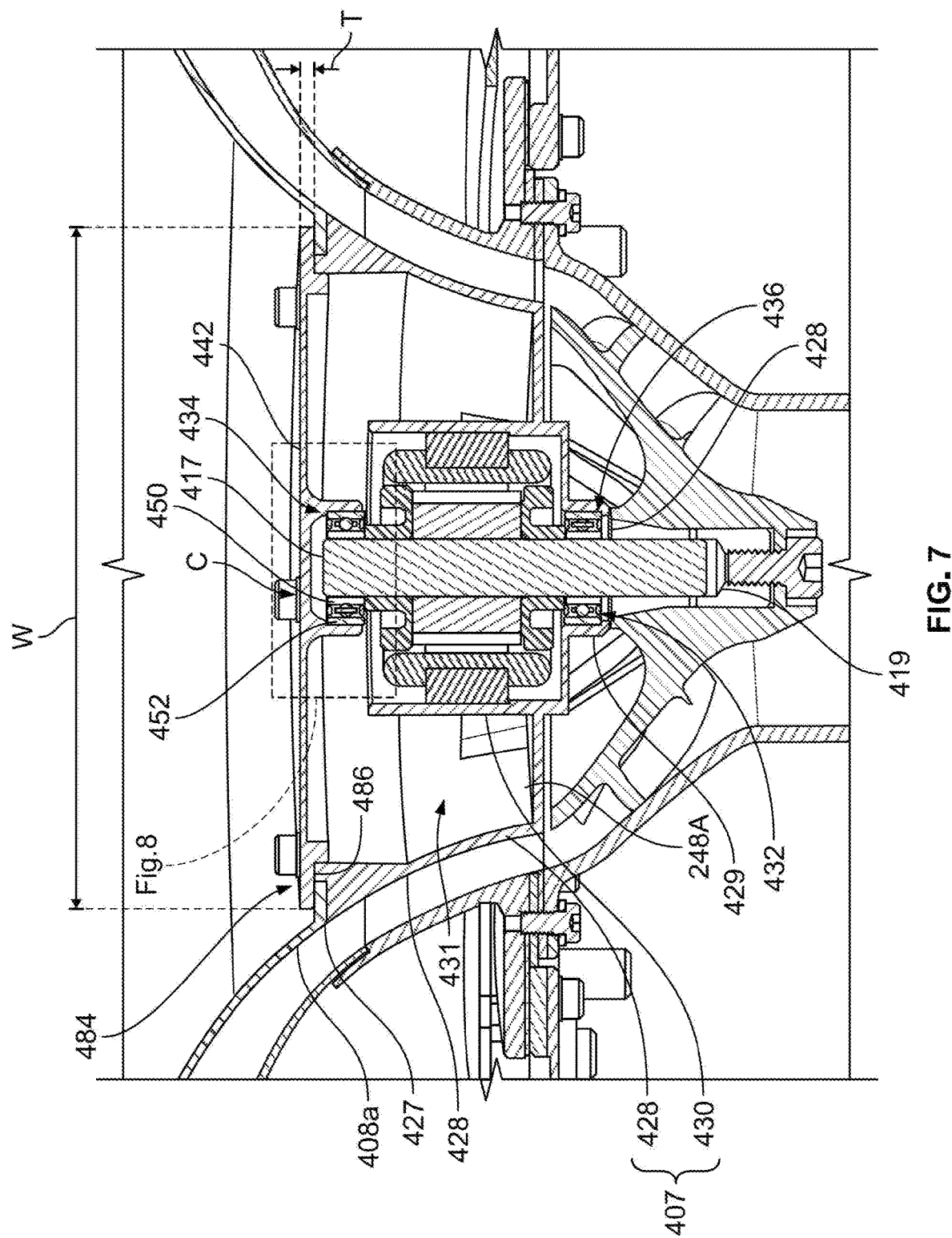
FIG. 7 is an enlarged view of a portion of FIG. 6.

With reference to FIG. 7, an enlarged view of a portion of FIG. 6, some of the structural features of the air compressor assembly 400 and particularly the motor housing 407 and the components housed within the motor housing 407 are first discussed in further detail. In this example, the motor housing 407 can overlie the impeller 412 at the outlet 404 of the air compressor assembly 400. As shown, the motor housing 407 can include an exterior wall 428 and an interior wall 430 that extends upwardly from an interior surface of the exterior wall 428. The interior wall 430 of the motor housing 407 can be positioned between the motor 406 and the exterior wall 428 of the motor housing 407 so as to create an interior space 431 in the area between the exterior wall 428 and the interior wall 430.

The motor housing 407 may be comprised of a stiff rigid material. In one embodiment, a stiff rigid material may be comprised of aluminum that has a modulus of elasticity of at least 68 GPa. In other examples, the modulus of elasticity may range from 68 to 72 GPa. In still other examples, the aluminum may fall outside of this range. Additionally, numerous other types of materials may be used in place of aluminum.

The interior wall 430 and all components of the motor housing 407 may be integrally formed with the exterior wall 428, such that the motor housing 407 is monolithic. In other examples, the motor housing 407 may be formed from one or more individual components that together form the motor housing. Forming the motor housing 407 as a monolithic housing limits movement between separate and individual pieces that can together form the housing. This monolithic structure further increases overall rigidity/stiffness of the motor housing 40.

The driveshaft 418 can extend through a central portion of the motor housing 407 and the overall air compressor assembly 400. A first end 417 of the driveshaft 418 can be coupled to a backplate 442. A second end 419 of the driveshaft 418 can extend beyond an exterior edge 429 of the motor housing 407. A portion of the second end 419 may extend beyond the exterior wall 428 of the motor housing and may be coupled to the impeller 412.

At least one bearing assembly may be used to provide rotation of the driveshaft 418. In one example, two bearing assemblies can be coupled to the driveshaft 418 and positioned within the interior wall 430 of the motor housing 407. A first distal bearing assembly 434 and a second proximal bearing assembly 432 may help to provide rotation of the driveshaft 418. The first distal and second proximal bearing assemblies 434, 432 may be ball bearing assemblies, but other types of bearing assemblies can also be utilized with the drive shaft 418.

The first distal bearing assembly 434 may be positioned at a first end 417 of the driveshaft 418 and seated within the backplate 426. The first distal bearing assembly 434 can include a first inner race 450 that extends around the driveshaft 418 and is positioned directly adjacent the driveshaft 418. A second outer race 452 can extend around both the first inner race 450 and driveshaft 418. A plurality of balls 455 may be positioned between the first inner race 450 and the second outer race 452, so that the first and second inner races 450,452 are spaced apart from one another. The first inner race 450 may be attached to the driveshaft 418, so that the second outer race 452 can freely rotate about the first inner race 450.

A second proximal bearing assembly 432 can be positioned between the first end 417 and second end 419 of the driveshaft 418. The second proximal bearing assembly 432 can be seated within an outermost end of the motor housing 407 and is adjacent the second spacer 438. Like the first distal bearing assembly, include a first inner race 458 that extends around the driveshaft 418 and is positioned directly adjacent the driveshaft 418. A second outer race 460 can extend around both the first inner race 458 and driveshaft 418. A plurality of balls 465 may be positioned between the first inner race 458 and the second outer race 460, so that the first and second inner races 458, 460 are spaced apart from one another. The first inner race 458 may be attached to the driveshaft 418, so that the second outer race 452 can freely rotate about the first inner race 450.

Additional components may be coupled to the driveshaft, including a first spacer 436 and a second spacer 438. The first and second spacer may be are respectively positioned adjacent the first distal bearing assembly 434 and the second proximal bearing assembly 432. One or more magnets 440 can be positioned between the first and second spacers 436,438. The first spacer 436 may be directly adjacent and abut the first distal bearing assembly 434 and the second spacer 438 may be directly adjacent and abut the second proximal bearing assembly 432. The interior space 431 can be filled with an epoxy or other insulant to help minimize the heat generated by the motor.

The first curved portion 408a of the diffuser 408 may be joined to a top edge 427 of the motor housing 407, and a backplate 424 may overlie the top edge 427 of the motor housing 407. Attaching the backplate 442 to the motor housing 407 encloses the interior space 431 within the motor housing 407.

The air compressor assembly 400 may include a dynamic axial preloading mechanism. In one example, the dynamic preloading mechanism includes the backplate 442. The backplate 442 may be circular and extend around the circular base circumference of the motor housing 407 so as to close off an outer end of the motor housing 407. The backplate 442 may include an exterior surface 444, an interior surface 446 that faces toward the interior space 431 of the motor housing. In one example, the bearing seat 470 may be integrally formed with the backplate 442.

The backplate 442 may be a flexible backplate designed to achieve radial stiffness. For example, this can be accomplished by designing the backplate 442 to have a high aspect ratio, where a width W of the backplate 442 is substantially greater than its thickness T. For example, the back plate may be have a width W that is at least 50 times greater than the thickness T. An example width W may be and an example thickness may be 77 mm wide and 1 mm thick. In other examples, the width may range from 35 to 350 mm and the thickness range from 0.35 mm to 3.5 mm. In still other examples the width W may be less than 50 times greater than the thickness T provided the backplate is configured to flex. Similarly, the width W may be more than 50 times greater than the thickness T.

The backplate 442 can be formed from a material that is capable of flexing at extreme temperatures without the material failing. For example, the backplate 442 may be formed from spring steel, aluminum, or other materials with suitable material properties including tensile strength and elongation at yield. The backplate 442 may be formed from any suitable manufacturing process which yields the desired material properties, including conventional methods, such as milling, extrusion, molding, casting, etc.

Figure 8:
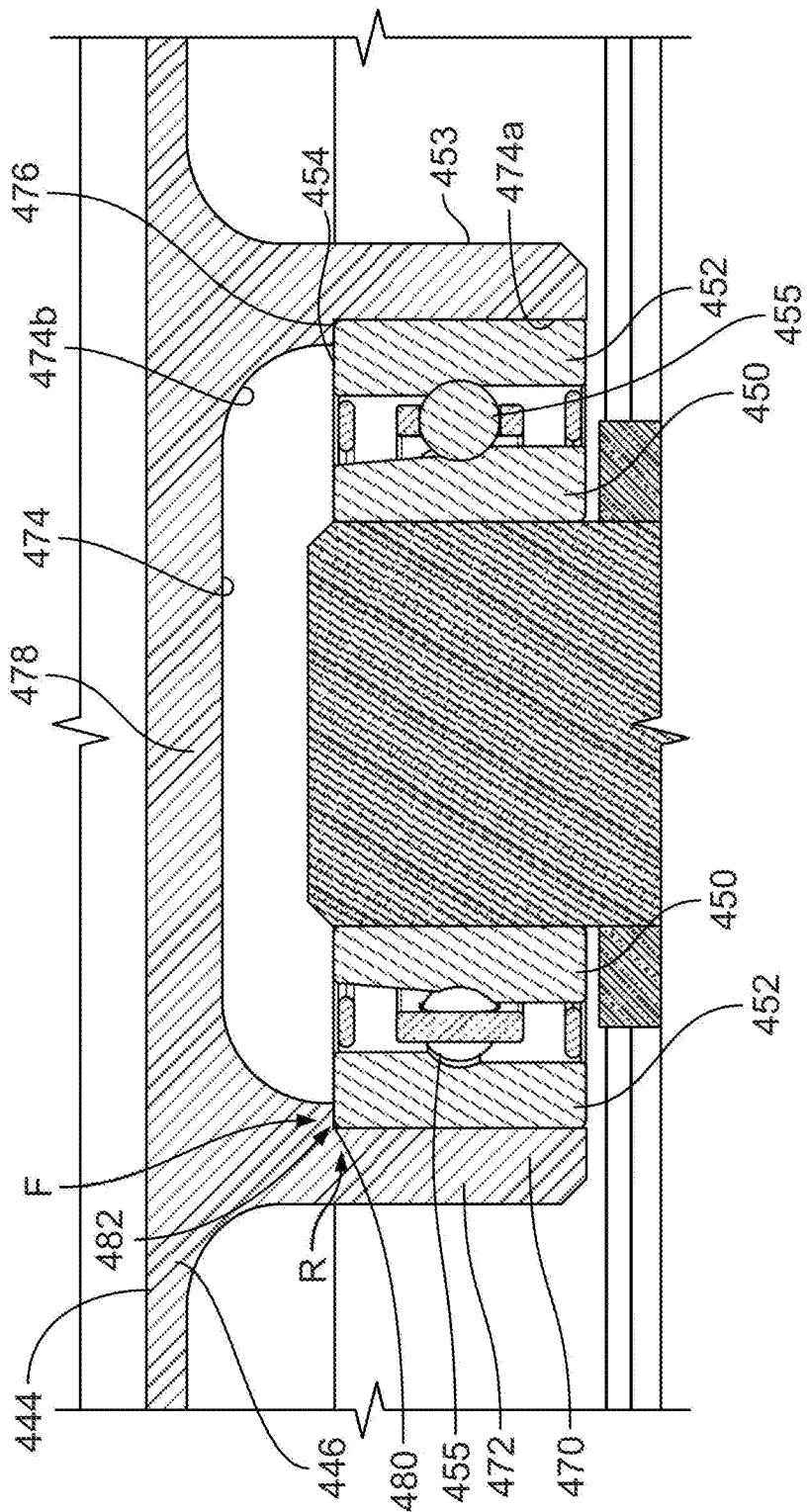
FIG. 8 is an enlarged view of a portion of FIG. 7.

A seat that overlies the backplate can be used to seat the first distal bearing assembly 434. In one example, bearing seat 470 can be integrally formed at a central portion C of the backplate 442. The bearing seat 470 can alternatively be separately formed and coupled or attached to the backplate 442. As shown in FIG. 8, an enlarged view of a portion of FIG. 7, a circumferential wall 472 of the bearing seat 470 extends upwardly from the interior surface 446 of the backplate 442. The bearing seat 470 is sized to receive and seat the first distal bearing assembly 434. An interior surface 474 of the bearing seat 470 can be generally u-shaped to complement the shape of the first distal bearing assembly 434. An interior edge or interior ridge 476 can divide the interior surface 474 into a lower interior edge surface 474a and an upper interior edge surface 474b. The upper interior edge surface 474b extends in a direction above the interior ridge 476 and away from the driveshaft 418, whereas the lower interior edge surface 474a extends in a direction below the interior ridge 476 and closer to the drive shaft 418. A corner or shoulder 482 is formed where the interior ridge 476 extends laterally away from the lower interior edge surface 474a and where the lower interior edge surface 474a extends vertically away from the interior ridge 476.

When the first distal bearing assembly 434 is seated within the bearing seat 470, the shoulder 482 of the bearing seat 470 may contact the second outer race 452. For example, the top surface 454 of the second outer race 452 can be in contact with the interior ridge 476 of the bearing seat 470. The lower interior edge surface 474a of the bearing seat 470 can contact the edge surface of the second outer race.

Figure 9:
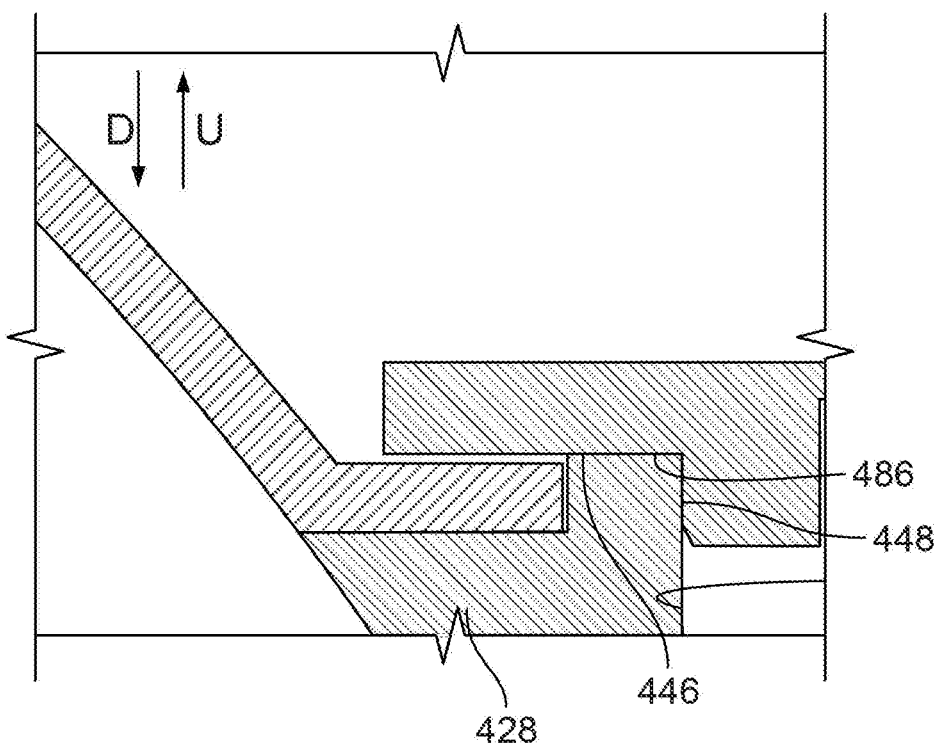
FIG. 9 is an enlarged view of apportion of FIG. 6.

Referring back to FIG. 6, screws 488 may extend around the circumferential edge to secure the backplate 426 to the motor housing. But, in other examples, different or additional forms of attachment may also be used. As shown in FIG. 9, an enlarged view of a portion of FIG. 6, when the backplate 426 is secured to the motor housing, the interior surface 446 of the backplate 442 can contact the circumferential top edge surface 486 of the exterior wall 428 of the motor housing 407. Additionally, an interior edge surface 448 of the backplate 442 can directly abut the circumferential top edge surface 486 of the exterior wall 428 of the motor housing 407. When the backplate 442 flexes, the interior edge surface 448 of the backplate 442 will be caused to move either downward in a direction D or upward in a direction U relative to the circumferential top edge surface 486 of the motor housing 428, depending on whether the backplate 442 is expanding or contracting.

During flight, the air compressor assembly may be used to change the altitude and direction of the unmanned vehicle. The motor 406 may cause rotation of the driveshaft 418 and the impeller 412. The impeller 412 may draw air from the environment surrounding the altitude control system into the inlet 402 of the air compressor assembly 400 and through the central cavity and into an envelope, such as outer envelope 210 and/or inner envelope 310. When the unmanned vehicle is at high altitudes, such as in the stratosphere, the temperature of the air surrounding the unmanned vehicle, as well as the air drawn into the compressor, and into the envelope, may be extremely cold.

To ensure that the bearing assembly remains engaged throughout the flight, a preloading force can be applied to the distal bearing of the motor to keep the desired preloading force consistent despite changes in the mechanical stack-up of the assembly. For example, the backplate 442, including bearing seat 470 (which may be integrally formed with the backplate 442), can apply the necessary preloading force to the first distal bearing assembly 434. Due to changes in temperature, for instance between different altitudes, as well as other external forces, the backplate 442 will be caused to flex, thereby applying an axial preloading force on the top and radial surface of the distal bearings along a top surface of the distal bearing. Additionally, the flexure can bring the interior surface of the seat, closer together with the motor housing 407.

For example, the backplate 442 may apply both an axial and radial force onto the first distal bearing assembly 434. As shown in FIG. 8, the interior bottom surface 478 of the backplate 442 can apply an axial force F onto the top surface 454 of the second outer race 452 of the first distal bearing assembly 434. In particular, the surface 480 of the interior ridge 476 faces toward the second outer race 452 and can exert a force F onto the second outer race 452. The lower interior edge surface 474a of the backplate 442 can also apply a lateral or radial force R onto the edges surface 453 of the second outer race 452. The axial force F, and radial force R help to ensure that the first inner and second outer races 450,452 of the first distal bearing assembly 434 remain engaged.

Figure 10:
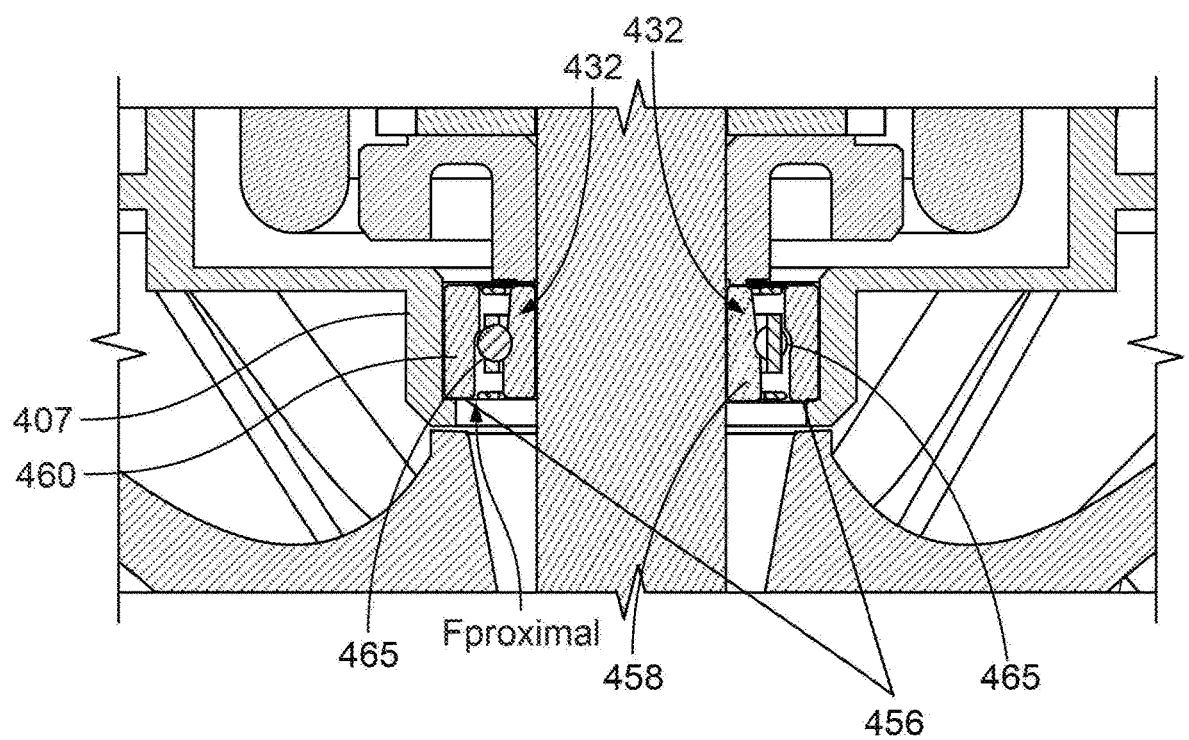
FIG. 10 is an enlarged view of a portion of FIG. 6.

The axial force F exerted onto the first distal bearing assembly 434 may also cause a force to be exerted onto the second proximal bearing assembly 432. Referring back to FIG. 6 and the enlarged view in FIG. 10, the axial force F can cause an axial force to be applied by the motor housing 407 onto the second proximal bearing assembly 432. For example, a force "Fproximal" can be applied to the bottom surface 456 of the second outer race 460 of the second proximal bearing assembly 432. This will cause the first inner race 458 and second outer race 460 of the second proximal bearing assembly 432 to remain engaged.

When flexed, the backplate 442 may further slightly bow in the middle at the bearing seat 470 due to the fact that the circumferential perimeter of the backplate 442 is fixed to the motor housing 407. This can cause the outer circumferential edge 484 of the backplate 442 to move in a direction D (FIG. 9) so that the interior surface 446 of the backplate 442 adjacent the circumferential top edge surface 486 of the motor housing 407 is moved closer to the motor housing 407, and the interior edge surface 448 of the backplate 442 moves closer to edge 490 of the motor housing 407. Such movement may be a distance that is in microns and not visible to the eye. In one example, the movement may be a distance of 500 microns, but in other examples, it can be more or less. At differing temperatures, the flexible plate will continue to flex closer to, as well as away from the motor housing 407. This in turn, allows for an increase or decrease in any space between the backplate 442 and the motor housing, as well as an increase or decrease in the preloading force applied to the distal bearing.

The attachment of the backplate 442 to the motor housing 407 may also provide support to the motor housing 407, so that a motor housing 407 can be used to house the motor 406 and withstand the high velocities of the rotating driveshaft 418. The motor housing 407 may be a rigid motor housing.

Thus, use of the features of the dynamic axial preloading mechanism of a compressor assembly of an altitude control system can provide rigid support for the rotating assembly, while applying preload across a very wide temperature range. Such features address the shortcomings associated with failure of the rotating shaft assembly of a motor within the unmanned aerial vehicle due to external forces to the bearing assembly caused by, for example, backpressure from within the envelope (including outer envelope and inner envelope), mismatched coefficient of thermal expansion between the driveshaft (for example formed of steel) and compressor housing (for example formed of aluminum), and large temperature changes caused by the environment surrounding a device within the unmanned aerial vehicle. This can help to prevent the catastrophic failure that would result from unloading the bearing at high speed. The features therefore compensate for changes in atmosphere, backpressure, temperature, etc. that would otherwise cause bearing assembly failure. By keeping the bearings preloaded, the life of the altitude control device can be extended. Moreover, the backplate 442 provides rigid radial support for the rotating assembly to ameliorate any undesirable rotordynamic effects. Use of a preloading mechanism to address these issues results in a mechanism that has no moving parts and can serve as the distal bearing support without needing clocking or anti-rotation mechanisms. Furthermore, the features disclosed eliminate the need to manufacture individual components that separately address these shortcomings.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
   an altitude control system for an aerial vehicle, the altitude control system comprising:
   a compressor assembly including:
   a compressor housing having a cavity extending therethrough, the compressor housing being comprised of a first material;
   a motor housing disposed within the compressor housing;
   a driveshaft extending through the motor housing, the driveshaft being comprised of a second material;
   a motor coupled to a driveshaft and disposed within the motor housing;
   a bearing assembly configured to provide axial rotation of the driveshaft; and
   a flexible plate coupled to the motor housing and the bearing assembly, and
   wherein a coefficient of thermal expansion of the first material differs from a coefficient of thermal expansion of the second material, and
   wherein the flexible plate is constructed to compensate for differences in rates of thermal expansion between the first and second materials by applying a preloading force to the bearing assembly that changes in response to changes in temperature, and
   wherein the flexible plate is constructed to compensate for differences in rates of thermal expansion experienced in the stratosphere.

2. The system according to claim 1, wherein the bearing assembly is a ball bearing assembly that includes a first inner race directly adjacent the driveshaft and a second outer race spaced away from the first inner race, wherein the flexible plate is directly adjacent the second outer race and applies the preloading force to the second outer race when the flexible plate compensates for differences in thermal expansion.

3. The system according to claim 2, wherein the flexible plate further includes a bearing seat, and wherein the bearing assembly is positioned within the bearing seat, the bearing seat of the flexible plate applies the preloading force to the second outer race.

4. The system of claim 3, wherein the bearing seat includes a circumferential wall extending upwardly from a surface of the flexible plate and forming a circumferential perimeter around a portion of the surface of the flexible plate; the bearing seat sized to secure the bearing assembly within the circumferential wall.

5. The system of claim 3, wherein the bearing seat transitions from a first diameter adjacent a surface of the flexible plate to a second diameter that is greater than the first diameter, wherein an interior ridge is formed at the transition between the first and second diameters, and wherein the bearing assembly contacts the interior ridge.

6. The system of claim 5, wherein the flexible plate is attached to the motor housing.

7. The system of claim 1, wherein the flexible plate is attached to the motor housing along a perimeter of the flexible plate.

8. The system of claim 1, further comprising an impeller coupled to an end of the driveshaft, the impeller configured to draw air into the compressor housing.

9. The system of claim 8, wherein the compressor housing further comprises an inlet and an outlet, wherein the impeller is positioned at the outlet, and wherein the motor housing overlies the impeller.

10. The system according to claim 1, further comprising an outer envelope configured to retain lift gas therein and an inner envelope disposed within the outer envelope, the inner envelope being configured to retain a ballast gas therein, wherein the compressor assembly regulates an amount of air within the inner envelope.

11. The system according to claim 1, further comprising an outer envelope and an inner envelope disposed within the outer envelope, the outer envelope configured to retain a ballast gas therein, wherein the compressor assembly regulates an amount of air within the outer envelope.

12. The system of claim 1, wherein the motor housing is open at one end and includes an opening, and wherein the flexible plate extends across the opening, so as to enclose an interior space of the motor housing.

13. A system comprising:
an altitude control system for an aerial vehicle, the altitude control system comprising:
a compressor assembly including:
a compressor housing having a cavity extending therethrough;
a motor housing disposed within the compressor housing;
a driveshaft extending through the motor housing;
a motor coupled to a driveshaft and disposed within the motor housing;
a bearing assembly configured to provide axial rotation of the driveshaft; and
a flexible plate attached to an end of the motor housing and coupled to the bearing assembly, and wherein when the flexible plate is in a first position, the flexible plate is spaced a first fixed distance from the motor housing and the flexible plate applies a first preloading force to the bearing assembly,
wherein in response to a change in temperature, the flexible plate is constructed to move into a second position where the flexible plate is a second fixed distance away from the motor housing that is less than the first fixed distance, the flexible plate applying a second preloading force to the bearing assembly in the second position that is different than the first preloading force,
wherein the flexible plate is constructed to move and change bearing preload in response to change in temperature due to altitude change.

14. The system according to claim 13, wherein the bearing assembly is a ball bearing assembly that includes a first inner race directly adjacent the driveshaft and a second outer race spaced away from the inner race, wherein the flexible plate is directly adjacent the second race and applies the preloading force to the second outer race when the flexible plate compensates for differences in thermal expansion.

15. The system according to claim 14, wherein the flexible plate further includes a bearing seat, and wherein the bearing assembly is positioned within the bearing seat, the bearing seat of the flexible plate applies the preloading force to the second outer race.

16. The system according to claim 15, wherein the bearing seat includes a circumferential wall extending upwardly from a surface of the flexible plate and forming a circumferential perimeter around a portion of the surface of the flexible plate; the bearing seat sized to secure the bearing assembly within the circumferential wall.

17. The system according to claim 15, wherein the bearing seat transitions from a first diameter closer to the surface of the flexible plate to a second diameter that is greater than the first diameter, wherein an interior ridge is formed at the transition between the first and second diameters, and wherein the bearing assembly contacts the interior ridge.

18. The system according to claim 13, further comprising an outer envelope and an inner envelope disposed within the outer envelope, the outer envelope configured to retain a ballast gas therein, wherein the compressor assembly regulates an amount of air within the outer envelope.

19. The system according to claim 13, further comprising an outer envelope configured to retain a lift gas therein and an inner envelope disposed within the outer envelope, the inner envelope being configured to retain a ballast gas therein, wherein the compressor assembly regulates an amount of air within the inner envelope.

20. The system according to claim 13, wherein the compressor assembly further comprises an impeller coupled to the driveshaft, and the motor housing overlies the impeller.

21. The system of claim 1 wherein the flexible plate is constructed to compensate for differences in rates of thermal expansion experienced at high altitudes at or above 18 kilometers.

22. The system of claim 13 wherein the flexible plate is constructed to move and change bearing preload in response to change in temperature due to an altitude change at high altitudes.

* * * * *